US007813357B2

(12) United States Patent
Deng et al.

(10) Patent No.: US 7,813,357 B2
(45) Date of Patent: Oct. 12, 2010

(54) REGIONAL SERVICE BY PHONE

(75) Inventors: Hui Deng, San Ramon, CA (US);
JianMing Tu, Shanghai (CN)

(73) Assignee: ArcSoft (Shanghai) Technology Company, Ltd., Shanghai (CN)

( * ) Notice: Subject to any disclaimer, the term of this patent is extended or adjusted under 35 U.S.C. 154(b) by 660 days.

(21) Appl. No.: 11/618,740

(22) Filed: Dec. 30, 2006

(65) Prior Publication Data

US 2008/0159303 A1    Jul. 3, 2008

(51) Int. Cl.
*H04L 12/56* (2006.01)
(52) U.S. Cl. ..................................... 370/401
(58) Field of Classification Search ......... 370/352–356, 370/401
See application file for complete search history.

(56) References Cited

U.S. PATENT DOCUMENTS

| 6,052,439 | A | 4/2000 | Gerszberg et al. |
| 6,345,239 | B1 * | 2/2002 | Bowman-Amuah ............ 703/6 |
| 6,853,621 | B1 | 2/2005 | Spear et al. |
| 6,931,111 | B1 * | 8/2005 | Coffee .................... 379/201.12 |
| 7,017,050 | B2 * | 3/2006 | Dalton et al. .................. 726/5 |
| 7,080,073 | B1 | 7/2006 | Jiang et al. |
| 2006/0100988 | A1 | 5/2006 | Hong et al. |
| 2006/0251054 | A1 | 11/2006 | Peters, Jr. et al. |

FOREIGN PATENT DOCUMENTS

EP          1603318 A2   12/2005

OTHER PUBLICATIONS

European Search Report, 6 pages.
International Search Report and Written Opinion, 7 pages.
Kundan Singh et al., "Peer-to-Peer Internet Telephone using SIP," paper, Department of Computer Science, Columbia University, pp. 1-19.
David R. Karger et al., "Diminished Chord: A Protocol for Heterogeneous Subgroup Formation in Peer-to-Peer Networks," paper, pp. 1-6.
Ion Stoica et al., "Chord: A Scalable Peer-to-peer Lookup Protocol for Internet Applications," paper, pp. 1-14.
"Chord project," from Wikipedia, the free encyclopedia, downloaded on Nov. 21, 2006 from http://en.wikipedia.org/wiki/Chord_project, pp. 1-4.
"SHA hash functions," from Wikipedia, the free encyclopedia, downloaded on Nov. 22, 2006 from http://en.wikipedia.org/wiki/Sha-1, pp. 1-10.

* cited by examiner

*Primary Examiner*—Frank Duong
(74) *Attorney, Agent, or Firm*—Patent Law Group LLP; David C. Hsia

(57) ABSTRACT

A method is provided to communicate regional services to a telephone gateway device over a public computer network. The method includes a distribution server sending a list of entities offering a desired service in a desired region to the telephone gateway device. The list includes probability parameters that the telephone gateway device uses in a lottery to arrange the order in which the entities are displayed. A service server adjusts the probability parameters based on the amount of information about the respective businesses accessed by the consumers and the price the respective businesses pay for the access.

20 Claims, 5 Drawing Sheets

REGIONAL SERVICE BY PHONE

CROSS REFERENCE TO RELATED APPLICATIONS

This application is related to U.S. application Ser. No. 11/280,688 entitled "Using PSTN to Communicate IP Addresses for Point-to-Point Text, Voice, Video, or Data Communication," which is commonly assigned and incorporated herein by reference.

This application is further related to (1) U.S. application Ser. No. 11/618,737, entitled "Point-to-Point Communication Using UPnP Protocol," (2) U.S. application Ser. No. 11/618,738, entitled "Network Communication Equipment With PPPoE Bridging Function," (3) U.S. application Ser. No. 11/618,739, entitled "Determining Pairings of Telephone Numbers and IP Addresses from Caching and Peer-to-Peer Lookup," and (4) U.S. application Ser. No. 11/618,741, entitled "Using Second Channel to Communicate IP Address for Point-to-Point Text, Voice, Video, or Data communication," which are concurrently filed, commonly assigned, and incorporated herein by reference.

FIELD OF INVENTION

This invention relates to methods for determining pairings of telephone numbers and IP addresses of devices for point-to-point communication over a public computer network.

DESCRIPTION OF RELATED ART

U.S. patent application Ser. No. 11/280,688, entitled "Using PSTN to Communicate IP Addresses for Point-to-Point Text, Voice, Video, or Data Communication," filed on Nov. 15, 2005, discloses a method for using the public switched telephone network (PSTN) to exchange Internet Protocol (IP) addresses for point-to-point communication between two devices over a public computer network (e.g., the Internet). In one example, a first device uses the PSTN to send its IP address to a second device to setup a network connection over the public computer network. The second device then sends a network connection request to the first device over the public computer network using the IP address. Once the network connection has been established, the first and the second devices exchange data packets carrying text, voice, video, or data communications between their users.

BRIEF DESCRIPTION OF THE DRAWINGS

Use of the same reference numbers in different figures indicates similar or identical elements.

SUMMARY

Figure 1:
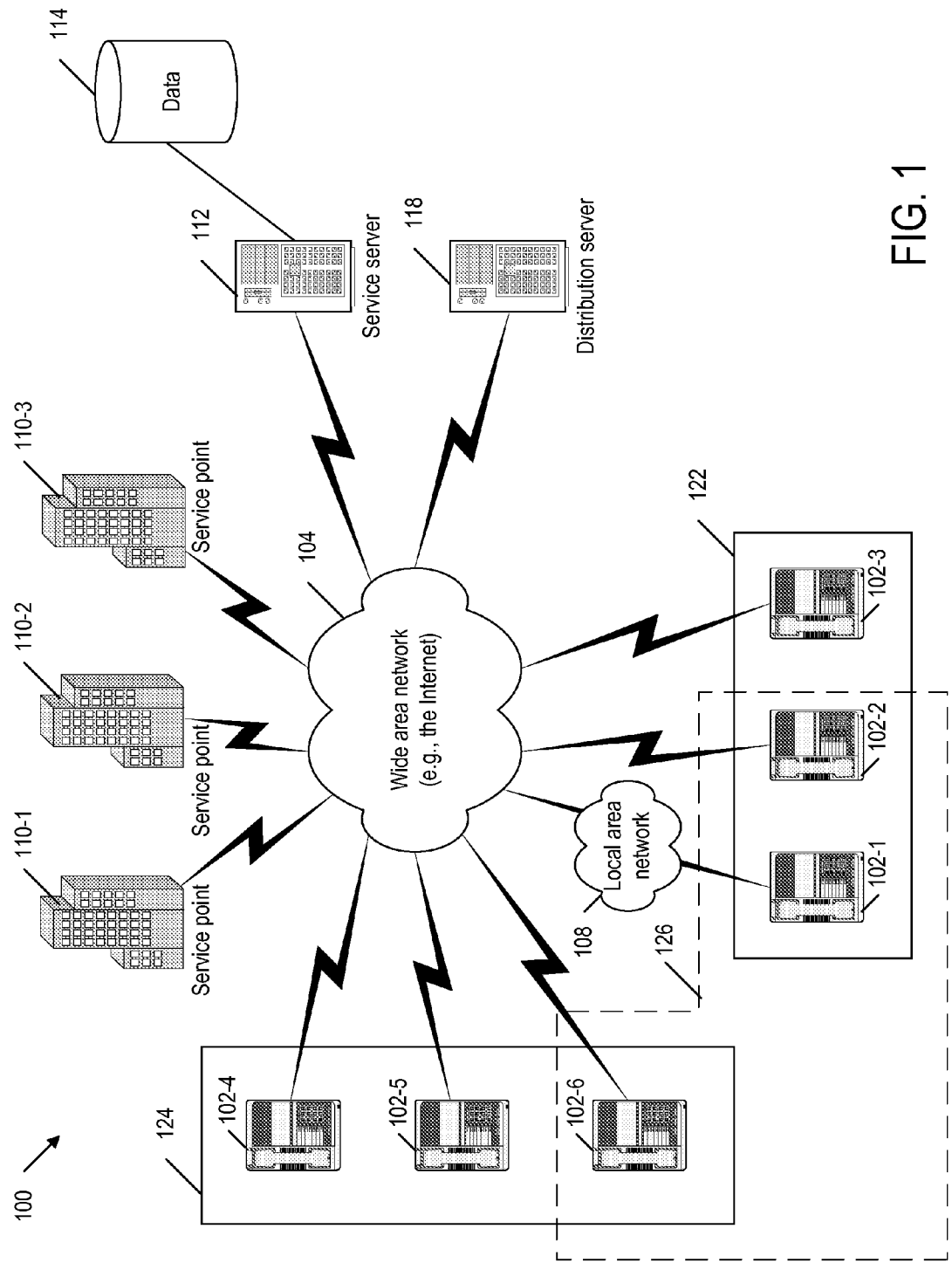
FIG. 1 is a block diagram of a system to provide regional services to telephone gateway devices in embodiments of the invention.

In one embodiment of the invention, a method is provided to communicate regional services to a telephone gateway device over a public computer network. The method includes a distribution server sending a list of entities offering a desired service in a desired region to the telephone gateway device. The list includes probability parameters that the telephone gateway device uses in a lottery to arrange the order in which the entities are displayed. A service server adjusts the probability parameters based on the amount of information about the respective businesses accessed by the consumers and the price the respective businesses pay for the access.

DETAILED DESCRIPTION

U.S. application Ser. No. 11/618,739, entitled "Determining Pairings of Telephone Numbers and IP Addresses from Caching and Peer-to-Peer Lookup," discloses a VoIP telephone gateway device that can determine its telephone number, cache pairings of telephone numbers and IP addresses for other VoIP telephone gateway devices, form a peer-to-peer network, lookup the pairings of telephone numbers and IP addresses through the peer-to-peer network, form subgroups in the peer-to-peer network, and find other devices of interest. Using the peer-to-peer network, a consumer can use the VoIP telephone gateway to search for business offering desired goods and services in the subgroups, or to receive information (e.g., advertisements) from the businesses offering the desired goods and services in the subgroups. As the amount of information provided through the VoIP telephone gateway is limited to its small screen and advertising costs for covering a large region may be high, the business may needs to be selective as to what consumers to target its information. Thus, a system is provided with the following features in embodiments of the invention.

First, a business is able to offer information about its goods and services to consumers in a region that the business is interested (e.g., based on the consumers' telephone numbers). Second, a consumer with a VoIP telephone gateway is able to receive information about businesses in a region that the consumer is interested (e.g., his or her local area). Third, an intermediary between the business and the consumer allows the business and the consumer to select the regions that they are interested. Fourth, the business registers with the intermediary and pays a fee for providing its information to the consumer. Fifth, as many businesses will be interested in offering the same goods and services to the consumer, the intermediary lists or distributes information about the businesses in an order based on probabilities assigned to the businesses based on fees and performance.

The proposed system solves several issues with conventional technologies. First, consumers are able to use telephone like devices instead of computers to search for goods and services online. Second, the consumers will only receive relevant information about businesses in their regions and not irrelevant information about distant businesses returned in typical web searches. Third, the consumers will only receive information about the goods and services offered by the businesses and not all the online materials related to the businesses (e.g., news) returned in typical web searches. Fourth, the listing or distribution of information about the businesses will be random since it is based on probability so that each business has a chance of being located in the beginning of the list. Fifth, the listing probability of each business can be partly based on the number of telephone calls from the consumers to the business and not the number of times a link is clicked, which can be easily falsified and may not correlate well to the business generated. Sixth, the VoIP telephone gateway reduces the telephone bill since business lookup and telephone calls to businesses are completed over a public wide area network, such as the Internet.

Businesses that may be listed in the intermediary in the system include (1) product delivery businesses such as convenient stores and takeout restaurants, (2) in-home services such as massage, laundry, house cleaning, home improvement, home inspection, home testing, and delivery services, (3) ticketing services such as tickets for airlines, trains, concerts, and sporting events, (4) reservation services such reservations for hotels, restaurants, and hair saloons, Businesses may push information through a distribution server in the system include. Some information can only be pushed at the requests of the consumers, such discounts, promotions, advertisements of grand openings, and opinion polls. Some information are pushed automatically, such as weather information, emergency alerts, and census.

FIG. 1 illustrates a system 100 in embodiments of the invention. System 100 includes VoIP telephone gateways 102-1, 102-2, 102-3, 102-4, 102-5, and 102-6 connected to a public wide area network (WAN) 104. Each VoIP telephone gateways 102-$i$ (where "i" is a variable) can be an external device connected to a POTS (plain old telephone service) telephone or an integrated device built into an IP (Internet Protocol) telephone. Each telephone gateway device 102-$i$ can be connected directly to WAN 104 or indirectly through a local area network (LAN). For example, telephone gateway device 102-1 is connected indirectly through a LAN 108 to WAN 104.

As described in U.S. application Ser. No. 11/618,739, entitled "Determining Pairings of Telephone Numbers and IP Addresses from Caching and Peer-to-Peer Lookup," consumers use VoIP telephone gateways 102-1 to 102-6 to make VoIP telephone calls and form a peer-to-peer network in order to perform peer-to-peer lookup of public IP addresses of other telephone gateway devices. Furthermore, VoIP telephone gateways can form one or more subgroups in the peer-to-peer network based on various criteria. For example, VoIP telephone gateways 102-1 to 102-3 form a virtual regional group 122 because they are located in the same local area (e.g., Fremont) based on their telephone numbers. VoIP telephone gateways 102-4 to 102-6 form a virtual regional group 124 because they are located in the same local area (e.g., San Francisco) based on their telephone numbers. VoIP telephone gateways 102-1, 102-2, and 102-6 form a virtual service group 126 because their consumers are interested in the same service from businesses. Since VoIP telephone gateways 102-1, 102-2, and 102-6 all are located in the same area (e.g., California), virtual service group 126 can also be considered a virtual regional service group in California.

Service points (e.g., businesses) 110-1, 110-2, 110-3 have computers or VoIP telephone gateways connected to WAN 104. Service points 110-1 to 110-3 use their computers or VoIP telephone gateways to join the peer-to-peer network. Service points 110-1 to 110-3 can also use their computers or VoIP telephone gateways to form or join one or more subgroups in the network based on their locations, their services, both their locations and services, or other criteria. Note that a VoIP telephone gateway at a service point can also simply be used as a telephone device, such as receiving phone calls from a consumer using another VoIP telephone gateway and searching for services through distribution server 118. In these instances, the VoIP telephone gateway of a service point operates like any other VoIP telephone gateway. Each service point 110-$j$ ("where "j" is a variable) registers with a service server 112 to receive a token used to participate in responding to searches for services from consumers using their VoIP telephone gateways.

Service server 112 administers the tokens and tracks the performance of the service points for billing purposes. Service server 112 adjusts probability parameters in tokens that control how service points will be listed in a search result by a VoIP telephone gateway according to the fee structures selected by the service points and the performances of the service points. In one embodiment, service server 112 is a server computer connected to WAN 104. Although only one is shown, multiple service servers 112 can be provided and they form a virtual service group in the peer-to-peer network. Each service server 112 can also each be part of a virtual regional group of VoIP telephone gateways.

In a search service, a consumer uses VoIP telephone gateway 102-$i$ to query a distribution server 118 to search for services offered by service points in the peer-to-peer network. In response, distribution server 118 searches the network for service points that match the search criteria of VoIP telephone gateway 102-$i$. Distribution server 118 then sends the search result to VoIP telephone gateway 102-$i$, which displays the service points in an order based probability. The consumer can use VoIP telephone gateway 102-$i$ to view additional information about the listed service points and call the service points or access information on the service points through websites on WAN 104 or distribution server 118. VoIP telephone gateway 102-$i$ sends the actions of the consumer to service server 112 for billing purposes and for adjusting the probability parameters of the service points. In one embodiment, distribution server 118 is also a VoIP telephone gateway 102-$i$ or a server computer connected to WAN 104. Although only one is shown, multiple distribution servers 118 can be provided and they form a virtual service group in the peer-to-peer network. Each distribution server 118 can also each be part of a virtual regional group of VoIP telephone gateways.

In a push service, service points (e.g., businesses) 110-1, 110-2, 110-3 send their tokens to distribution server 118 so they are included in a list of service points that distribution server 118 actively sends to VoIP telephone gateways of consumers that agree to receive such information. As described above, a consumer can use VoIP telephone gateway 102-$i$ to access additional information about the listed service points and call or access the service points. VoIP telephone gateway 102-$i$ sends these actions to service server 112 for billing purposes and for adjusting the probability parameter in the tokens of the service points.

Figure 2A:
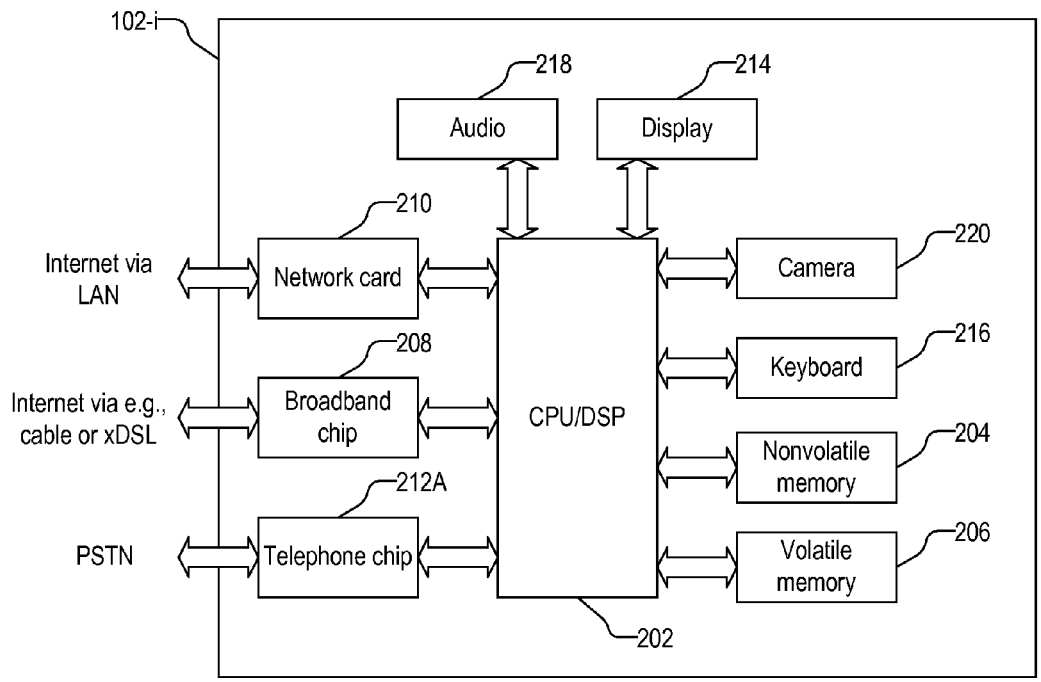
FIGS. 2A and 2B are block diagrams of telephone gateway devices in embodiments of the invention.

FIG. 2A illustrates an example of a telephone gateway device 102-$j$ integrated with an IP telephone in one embodiment of the invention. Telephone gateway device 102-$j$ has the form factor of a telephone or a videophone. Telephone gateway device 102-$j$ includes a central processing unit (CPU) or digital signal processor (DSP) 202 that executes VoIP software loaded from nonvolatile memory 204 to volatile memory 206. CPU 202 also executes software for communicating with servers 112 and 118 loaded from nonvolatile memory 204 to volatile memory 206. CPU 202 can use a network card 210 to indirectly access WAN 104 through a LAN. Alternatively, CPU 202 can use a broadband chip 208 to directly access WAN 104 by cable or xDSL (digital subscriber line).

CPU 202 uses a telephone chip 212A to access a public switched telephone network (PSTN) for POTS or for exchanging public IP addresses with another telephone gateway device. Telephone chip 212A includes a modem for generating and receiving signals over the PSTN. For text, voice, and video communications, CPU 202 may be further connected to peripherals including a display 214, a keypad or keyboard 216, microphone and speaker 218, and a camera 220. For example, CPU 202 shows information about businesses provided by server computers 112 and 118 in display 214.

Figure 2B:
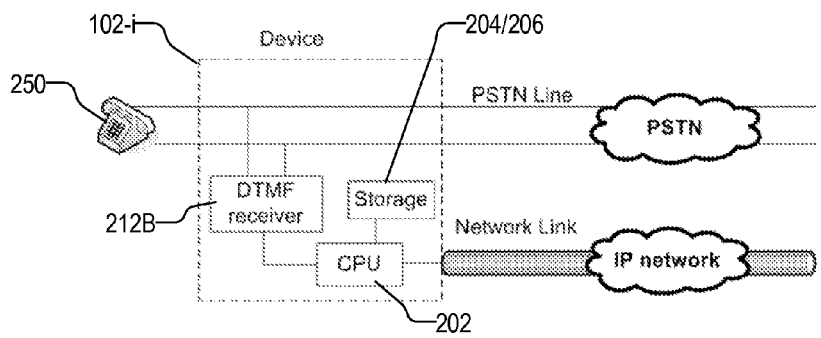

FIG. 2B illustrates an example of a telephone gateway device 102-j that is an external device connected to a POTS telephone 250. In this embodiment, telephone chip 212A is replaced with a dual-tone multi-frequency (DTMF) receiver 212B coupled in parallel to the PSTN with POTS telephone 250.

Figure 3:
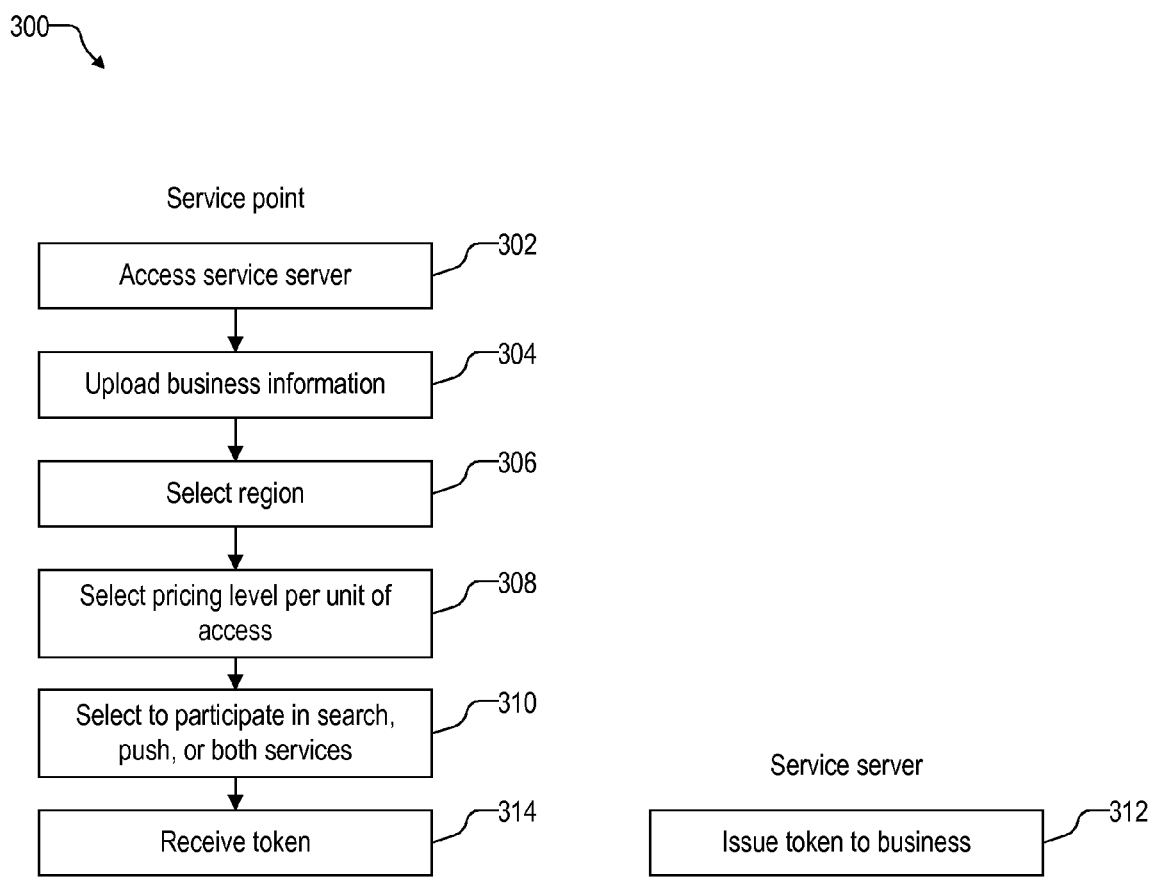
FIG. 3 shows flowcharts of a method for a service point (e.g., a business) to register with a service server computer in one embodiment of the invention.

FIG. 3 illustrates flowcharts of a method 300 for a service point 110-j (FIG. 1) to register with service server 112 (FIG. 1) in one embodiment of the invention.

In step 302, a representative of service point 110-j (hereafter referred to simply as "service point") uses a computer to access service server 112. Service point 110-j can use a web browser on its computer to access a website of service server 112 through public WAN 104 (FIG. 1).

In step 304, service point 110-j uploads information about itself in a predetermined format recognized by service server 112. The information includes descriptions of the services offered by service server 110-j, and the telephone number and the address of service server 110-j. The descriptions of goods and services may be provided in levels of more and more details. For example, the first level of description may include the name, the telephone number, and the type of goods and services offered by business 110-j. The second level may include stores hours, the physical address, and the web address of business 110-j. The third level may include advertisement for specials and sales offered by business 110-j.

In step 306, service point 110-j selects a region where it wishes to provide its services. In one embodiment, regional classification is based on telephone numbers. In the United States, a telephone number of WWW-XXX-YYY-ZZZZ is generally divided into 4 levels where WWW indicates the country, XXX indicates an area code, and YYY may indicate a more specific area within the area code. To select a region, service point 110-j provides telephone numbers from left to right and up to a digit that demarcates the region which it wishes to target. Thus, anything to the right of the last digit in the telephone number is treated as a wild character. For example, assume service point 110-j selects 001-510-???-???? where "?" is a wild character. Thus, service point 110-j has selected a region of consumers with telephone numbers starting with 001-510.

In step 308, service point 110-j selects a pricing level for listing its information through service server 112. In one embodiment, business 110-j selects a price per unit of access (e.g., request for additional description of a service point or a telephone call to a service point) by the consumers, which will be described in more detail later.

In step 310, service point 110-j selects to be listed in a search service, in a push service, or both.

In step 312, service server 112 creates a token for service point 110-j in response to the information provided by service point 110-j. The token records the address, the telephone number, the business type, and the description of service of service point 110-j. The token further records a probability parameter used to determine what order to list service point 110-j among a list of service points offering the same services in response to a search from a consumer.

In one embodiment, the probability parameter is based on the weighted product of (1) the pricing level per unit access selected by service point 110-j and (2) units of access by consumers to service point 110-j, and (3) consumer feedbacks on quality of service rated. Higher pricing level equates to a higher probability, and greater units of access equate to a higher probability. In one embodiment, the units of access is based on the number of levels of description about service point 110-j requested by the consumers and the number of telephone calls from the consumers to service point 110-j. For example, each level of description counts as 0.5 unit of access and a telephone call from a consumer to service point 110-j counts as 1 unit of access. Thus, service point 110-j has two ways to increase its probability parameter. First, service point 110-j can raise the pricing it pays to service server 112 per unit of access. Second, service point 110-j can improve performance to increase the number of times the consumers access service point 110-j and the consumer feedbacks on the quality of service.

In step 314, service point 110-j receives the token from service server 112 and loads it into its computer or VoIP telephone gateway.

Figure 4:
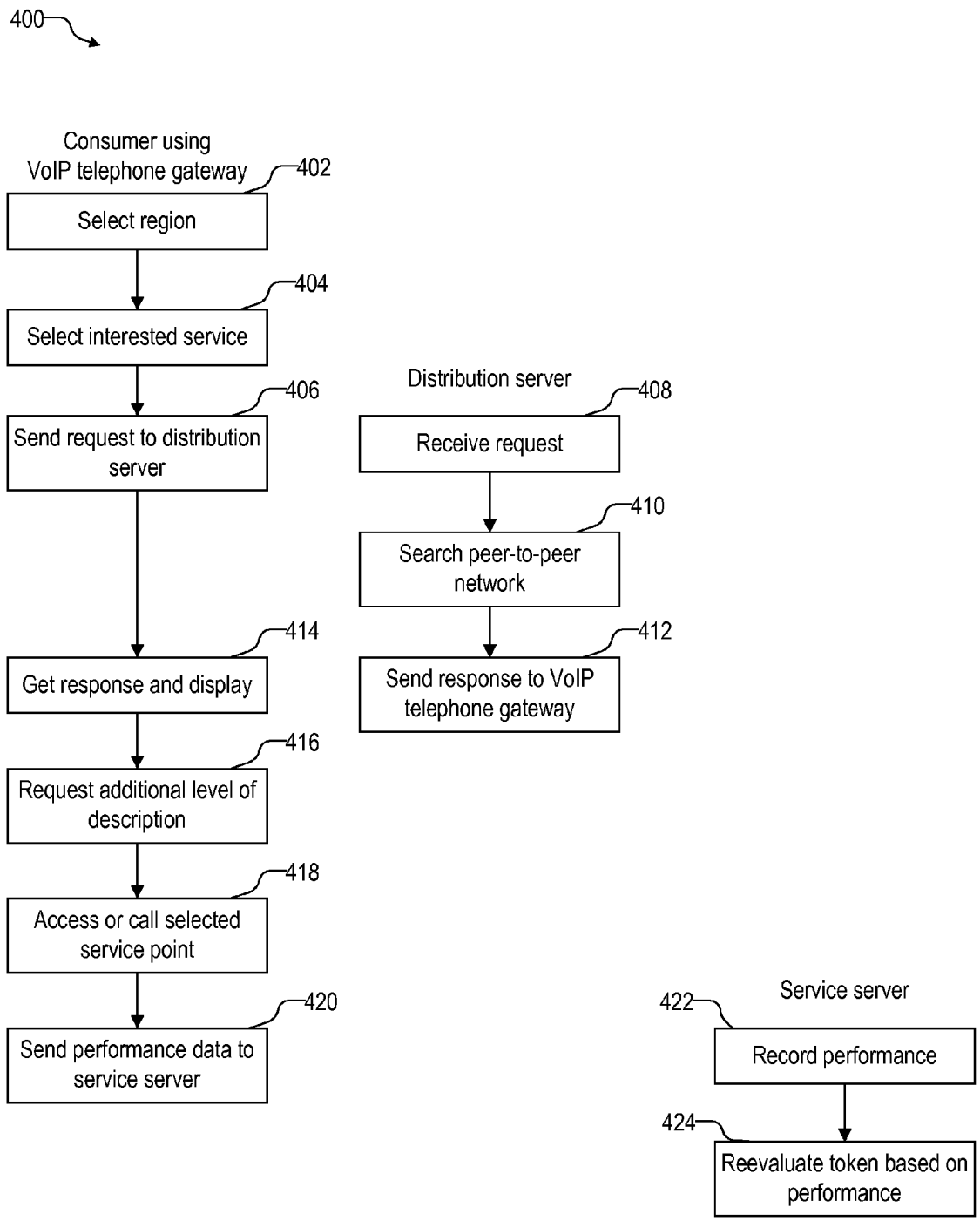
FIG. 4 shows flowcharts of a method for a consumer to use a voice over IP (VoIP) telephone gateway to search for service points of interest in a peer-to-peer network in one embodiment of the invention.

FIG. 4 illustrates flowcharts of a method 400 for a consumer to use VoIP telephone gateway 102-i (FIG. 1) to search for a business using service server 112 (FIG. 1) in one embodiment of the invention.

In step 402, a consumer uses VoIP telephone gateway 102-i to select a region in which to search for a business. The consumer can input part of a telephone number to select the region. For example, the consumer inputs 001 to select United States or 001-510 to select an area in California. The consumer can input a word to select the region. For example, the consumer can input "CA" to select California. The consumer can choose a region by scrolling through a list of regions displayed by VoIP telephone gateway 102-i.

In one embodiment, VoIP telephone gateway 102-i selects a default region based on its telephone number or public IP address according, which can be determined according to methods disclosed in U.S. application Ser. No. 11/618,739, entitled "Determining Pairings of Telephone Numbers and IP Addresses from Caching and Peer-to-Peer Lookup."

In step 404, the consumer uses VoIP telephone gateway 102-i to select a service of interest. The consumer can input a word to select the service. The consumer can choose a service by scrolling through a list of services displayed by VoIP telephone gateway 102-i.

In step 406, VoIP telephone gateway 102-i sends a search request including the selected region and service to distribution server 118. If there are multiple distribution servers 118, VoIP telephone gateway 102-i sends the search request to one that is in its virtual regional group.

In step 408, distribution server 118 receives the request apply.

In step 410, distribution server 118 searches the peer-to-peer network for service points that match the criteria provided by the consumer. In one embodiment, distribution server 118 searches for service points in the selected region and also service points in a level up from the selected region. For example, assume the consumer selected a region having telephone number of 001-510-222-????. Instead of only retrieving businesses having telephone numbers starting with 001-510-222, business listing server computer 112 also retrieves businesses having telephone numbers starting with 001-510-22.

In step 412, distribution server 118 sends a list of the service points with their probability tokens to VoIP telephone gateway 102-i. Distribution server 118 can also send additional levels of description now or when requested later by VoIP telephone gateway 102-i.

In step 414, VoIP telephone gateway 102-*i* receives the list of service points and arranges the order of the service points using a lottery system based on their probability parameters. For example, assume the list includes service point A with a weight of 100, service point B with a weight of 80, service point C with a weight of 75, a service point D with a weight of 50, a service point E with a weight of 120, then service point A has a probability of 100/(100+80+75+50+120), or 23.53% chance to be selected first, service point B has a probability of 18.82% chance of being selected first, and so on. Although the service point with the largest probability has a higher chance to be selected before the other service points, all service points have a chance to be selected before the others albeit with different probabilities. In one embodiment, VoIP telephone gateway 102-*i* reserves a fixed number of first spots (e.g., the first ten spots) for businesses located in the selected region. VoIP telephone gateway 102-*i* displays the ordered list of service points on display 214.

In step 416, the consumer instructs VoIP telephone gateway 102-*i* to show the description on a selected service point from the list on display 214. The consumer scrolls through the description and optionally requests addition descriptions about the selected service point. VoIP telephone gateway 102-*i* repeats step 416 if the consumer selects another service point from the list.

In step 418, the consumer may use VoIP telephone gateway 102-*i* to call or access the selected service point to engage its services.

In step 420, VoIP telephone gateway 102-*i* sends the units of access of the selected service point to service server 112 for billing purposes. Note that VoIP telephone gateway 102-*i* also informs service server 112 if it attempted to call a service point and the telephone line is busy. VoIP gateway 102-*i* also allows the consumer to fill out a survey on the quality of service (e.g., great, good, poor, or bad) and then sends the result to service server 112. Alternatively, the consumer can fill out a survey at the end of the telephone call to the selected service point or through a telephone call to a complaint line for service server 112.

In step 422, service server 112 receives and records the units of access for the selected service points provided by VoIP telephone gateway 102-*i* in the token of the selected service point. Specifically, service server 112 records the number of levels of description on the selected service point requested by the consumer in step 416 and the number of telephone calls or access to the selected service point in step 418. The consumer can use VoIP telephone gateway 102-*i* to provide a survey of the selected service point to service server 112. The result of the survey may be an additional factor in the calculation of the probability parameter.

In step 424, service server 112 reevaluates the probability parameter in the token of the selected service pointer based on its performance. As described above in step 312 (FIG. 3), the probability parameter is based on the weighted product of (1) the pricing level per unit access selected by the business, (2) units of access to business by consumers, and (3) quality of service provided in consumer surveys. Service server 112 also charges the selected service pointer fees based on the units of access and the agreed upon price per unit of access. Service server 112 can send the updated token to the selected service point or the selected service point can periodically update its token from service server 112. In one embodiment, if VoIP telephone gateway 102-*i* attempted to call a service point and the telephone line is busy, service server 112 reduces the probability parameter of that service point as a penalty for the poor service.

Figure 5:
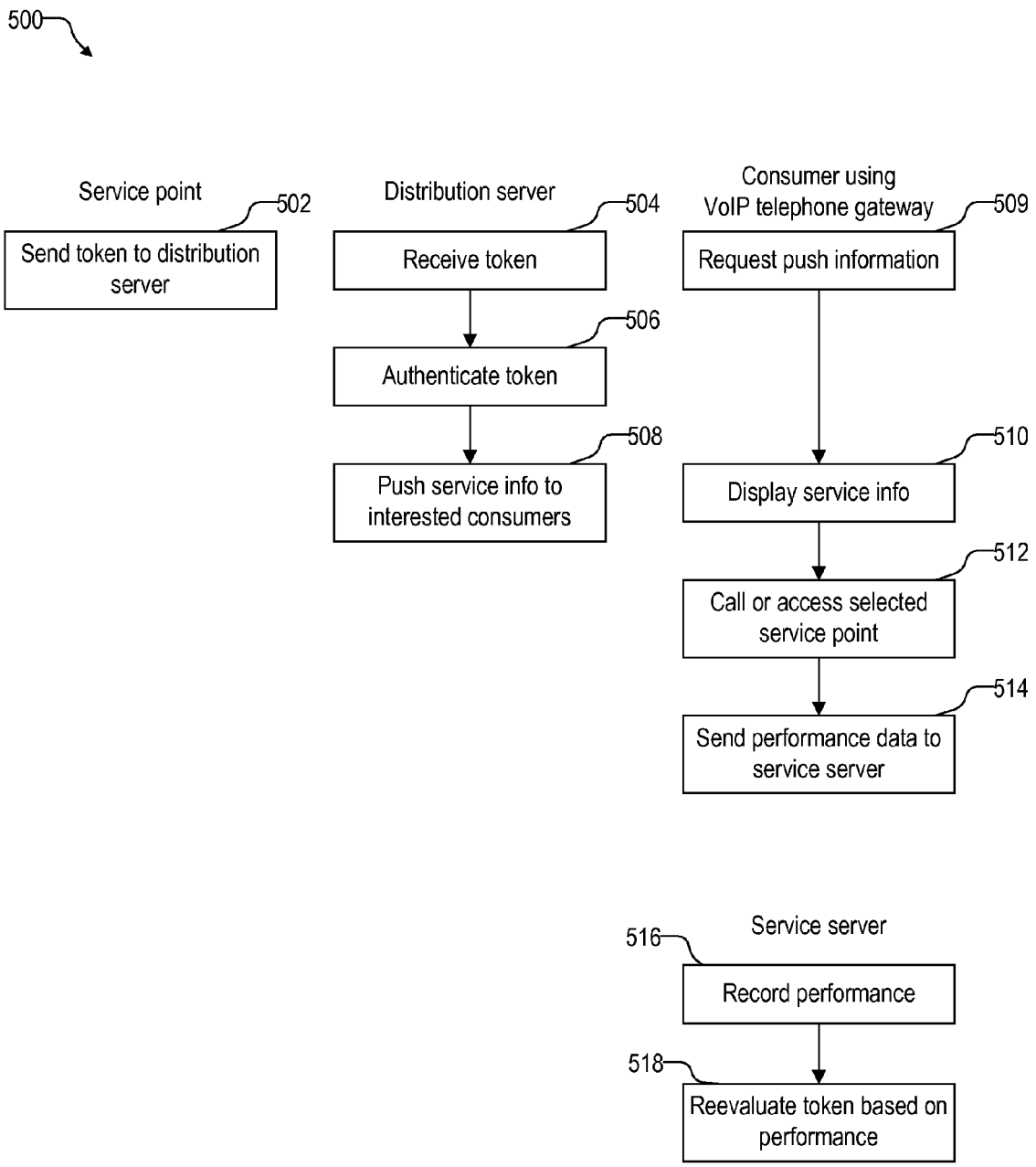
FIG. 5 shows flowcharts of a method for a service point to register with the service server computer and for a distribution server computer to provide information about the business to VoIP telephone gateways in one embodiment of the invention.

FIG. 5 illustrates flowcharts of a method 500 for service point 110-*j* (FIG. 1) to for a consumer to use VoIP telephone gateway 102-*i* (FIG. 1) to request push service about service points using distribution server 118 in one embodiment of the invention.

In step 502, service point 110-*j* uses its computer to receive its token and send its token to distribution server 118 to be included in a list of service points distributed to interested consumers through their VoIP telephone gateways. If there are multiple distribution servers 118, service point 110-*j* sends its token to one that is in its virtual regional group.

In step 504, distribution server 118 receives the token from service point 110-*j*.

In step 506, distribution server 118 authenticates the token.

In step 508, if the token is legal, distribution server 118 will push information about service point 110-*j*, along with information with other service points offering the same service to the same region, to VoIP telephone gateways of consumers that agreed or need to receive such information. Typically distribution server 118 waits until it has received information from a sufficient number of service points before sending the list to the VoIP telephone gateways or when a specific amount of time has passed (e.g., a time out).

In step 509, a consumer uses VoIP telephone gateway 102-*i* to send a request to distribution server 118 to receive information through a push service for a selected service and a selected region.

In step 510, the consumer uses VoIP telephone gateway 102-*i* to view the list of service points on display 214 (FIG. 2). As described in step 414 (FIG. 4), VoIP telephone gateway 102-*i* arrange the order of the service points using a lottery system based on their probability parameters. A consumer scrolls through the list and selects one of the service points using keypad 216 (FIG. 2).

In step 512, the consumer may use VoIP telephone gateway 102-*i* to call or access the selected service point to engage its services.

In step 514, VoIP telephone gateway 102-*i* sends the units of access of the selected service point to service server 112 for billing purposes. Note that VoIP telephone gateway 102-*i* also informs service server 112 if it attempted to call a service point and the telephone line is busy. VoIP gateway 102-*i* also allows the consumer to fill out a survey on the quality of service (e.g., great, good, poor, or bad) and then sends the result to service server 112.

In step 516, service server 112 receives and records the units of access for the selected service points provided by VoIP telephone gateway 102-*i* in the token of the selected service point. Specifically, service server 112 records the number of telephone calls or access to the selected service point in step 418. The consumer can also use VoIP telephone gateway 102-*i* to provide a survey of the selected service point to service server 112. The result of the survey may be an additional factor in the calculation of the probability parameter.

In step 518, service server 112 reevaluates the probability parameter in the token of the selected service point based on its performance. As described above in step 312 (FIG. 3), the probability parameter is based on the weighted product of (1) the pricing level per unit access selected by the business, (2) units of access to business by consumers, and (3) quality of service rated by the consumers in surveys. Service server 112 also charges the selected service pointer fees based on the units of access and the agreed upon price per unit of access. Service server 112 can send the updated token to the selected service point or the selected service point can periodically update its token from service server 112. In one embodiment, if VoIP telephone gateway 102-*i* attempted to call a service point and the telephone line is busy, service server 112 reduces the probability parameter of that service point as a penalty for the poor service.

Various other adaptations and combinations of features of the embodiments disclosed are within the scope of the invention. Numerous embodiments are encompassed by the following claims.

What is claimed is:

1. A method for a telephone gateway device to receive regional service from a distribution server, comprising:
   sending a request for a service in a region to the distribution server;
   receiving a list of entities that provide the service in the region and their respective probability parameters from the distribution server, wherein the probability parameters determine an order in which the entities are displayed on the telephone gateway device;
   arranging, using the telephone gateway device, an order of the entities in the list through a lottery based on the probability parameters; and
   displaying the list.

2. The method of claim 1, further comprising:
   receiving from a consumer a selection of an entity from the list;
   displaying, using the telephone gateway device, an initial level of description about the selected entity; and
   when requested by the consumer, displaying at least one additional level of description about the selected entity.

3. The method of claim 2, further comprising:
   providing, using the telephone gateway device, a telephone connection to the selected entity.

4. The method of claim 3, wherein each probability parameter is based on units of access including at least one of a number of additional levels of description about a respective business that has been requested and a number of times the respective business has been called.

5. The method of claim 4, wherein each probability parameter is further based on a fee level per unit of access paid by the respective business.

6. The method of claim 5, wherein each probability parameter is further based on consumer feedbacks on quality of service.

7. The method of claim 6, wherein each probability parameter is a result of a weighted product of the fee level per unit access, the units of access, and the consumer feedbacks.

8. A method for a distribution server to communicate regional services to a telephone gateway device over a public computer network, comprising:
   receiving a request for a service in a region from the telephone gateway device; and
   sending, using the distribution server, a list of entities that provide the service in the region and their respective probability parameters to the telephone gateway device, wherein the probability parameters determine an order in which the entities are displayed on the telephone gateway device through a lottery.

9. The method of claim 8, further comprising, after said receiving and prior to said sending:
   searching, using the distribution server, a peer-to-peer network for the entities that provide the service in the region.

10. The method of claim 8, further comprising:
    receiving, using the distribution server, requests from the entities to be included in the list.

11. A method for a service server to provide listings of regional services to a telephone gateway device over a public computer network, comprising:
    receiving contact information about an entity;
    receiving a service the entity wishes to provide;
    receiving a region the entity wishes to target; and
    generating, using the service server, a token for the entity, the token including a probability parameter used by the telephone gateway device to randomly determine in a lottery an order in which the entity is displayed along with other entities.

12. The method of claim 11, further comprising:
    receiving units of access for the entity from the telephone gateway device, the units of access including at least one of a number of additional levels of description about the service provided by the entity and a number of times the entity has been called; and
    updating, using the service server, the token by adjusting the probability parameter based on the units of access.

13. The method of claim 12, wherein the probability parameter is further based on a fee level per unit of access paid by the entity.

14. The method of claim 13, wherein the probability parameter is further based on consumer feedbacks on quality of the service provided by the entity.

15. The method of claim 14, wherein the probability parameter is a weighted product of the fee level per unit access, the units of access, and the consumer feedback.

16. The method of claim 13, further comprising:
    charging, using the service server, the entity a fee based on the units of access and the fee level per unit of access.

17. The method of claim 11, further comprising:
    receiving a search request for the service in the region from the telephone gateway device; and
    sending, using a distribution server, a list of entities, including the entity, that provide the service in the region and their respective probability parameters to the telephone gateway device.

18. The method of claim 17, further comprising, after said receiving a search request and prior to said sending a list of entities:
    searching, using the distribution server, a peer-to-peer network for the entities that provide the service in the region, the peer-to-peer network including the entities and telephone gateway devices, the telephone gateway devices including the telephone gateway device.

19. The method of claim 11, further comprising:
    receiving a push request from the telephone gateway device, the push request indicating the telephone gateway device agrees to periodically receive information about entities, including the entity, that provide the service in the region; and
    sending, using a distribution server, the information about the entities and their respective probability parameters to the telephone gateway device.

20. The method of claim 19, wherein the information is one of discounts, promotions, advertisements for grand openings, and opinion polls.

\* \* \* \* \*